July 28, 1936. J. S. BAKER 2,049,100
HELICAL BELLOWS AND METHOD OF MAKING THE SAME
Filed March 21, 1932 5 Sheets-Sheet 1
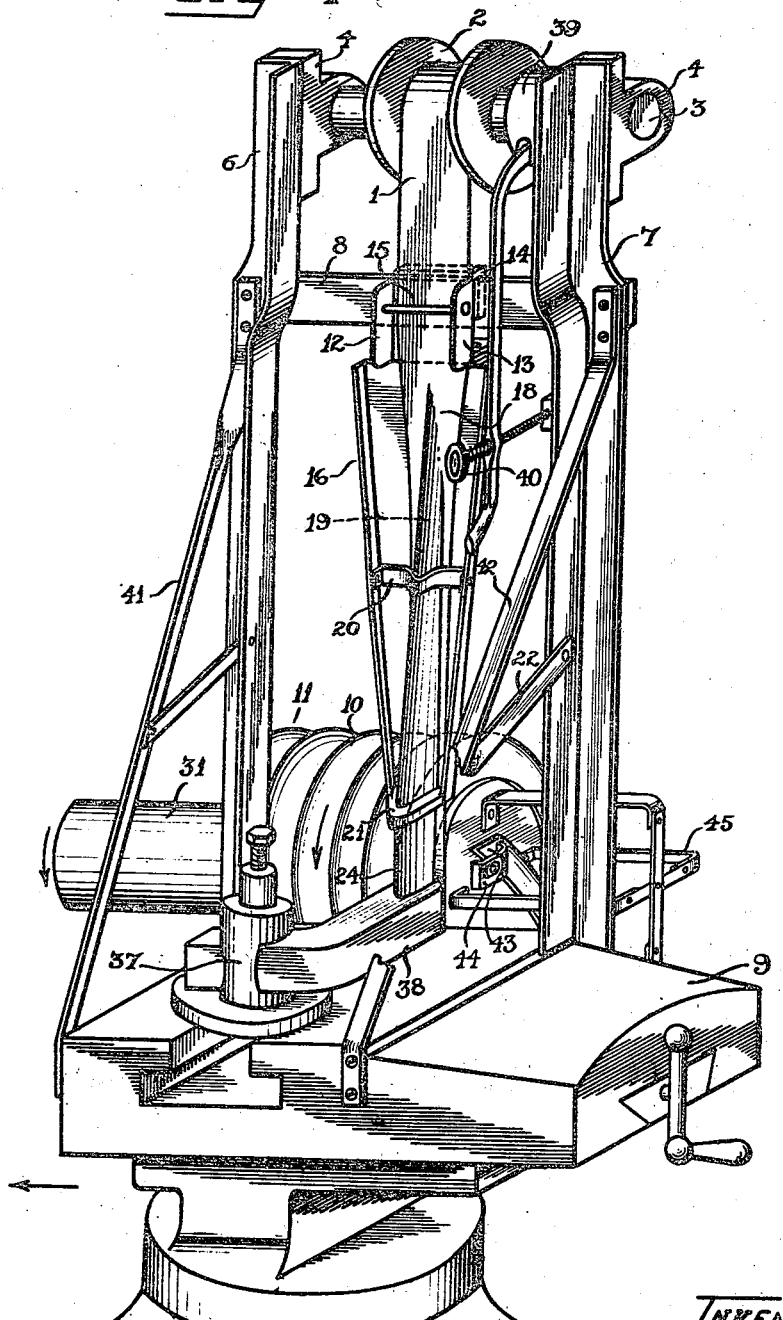

July 28, 1936. J. S. BAKER 2,049,100
HELICAL BELLOWS AND METHOD OF MAKING THE SAME
Filed March 21, 1932 5 Sheets-Sheet 2
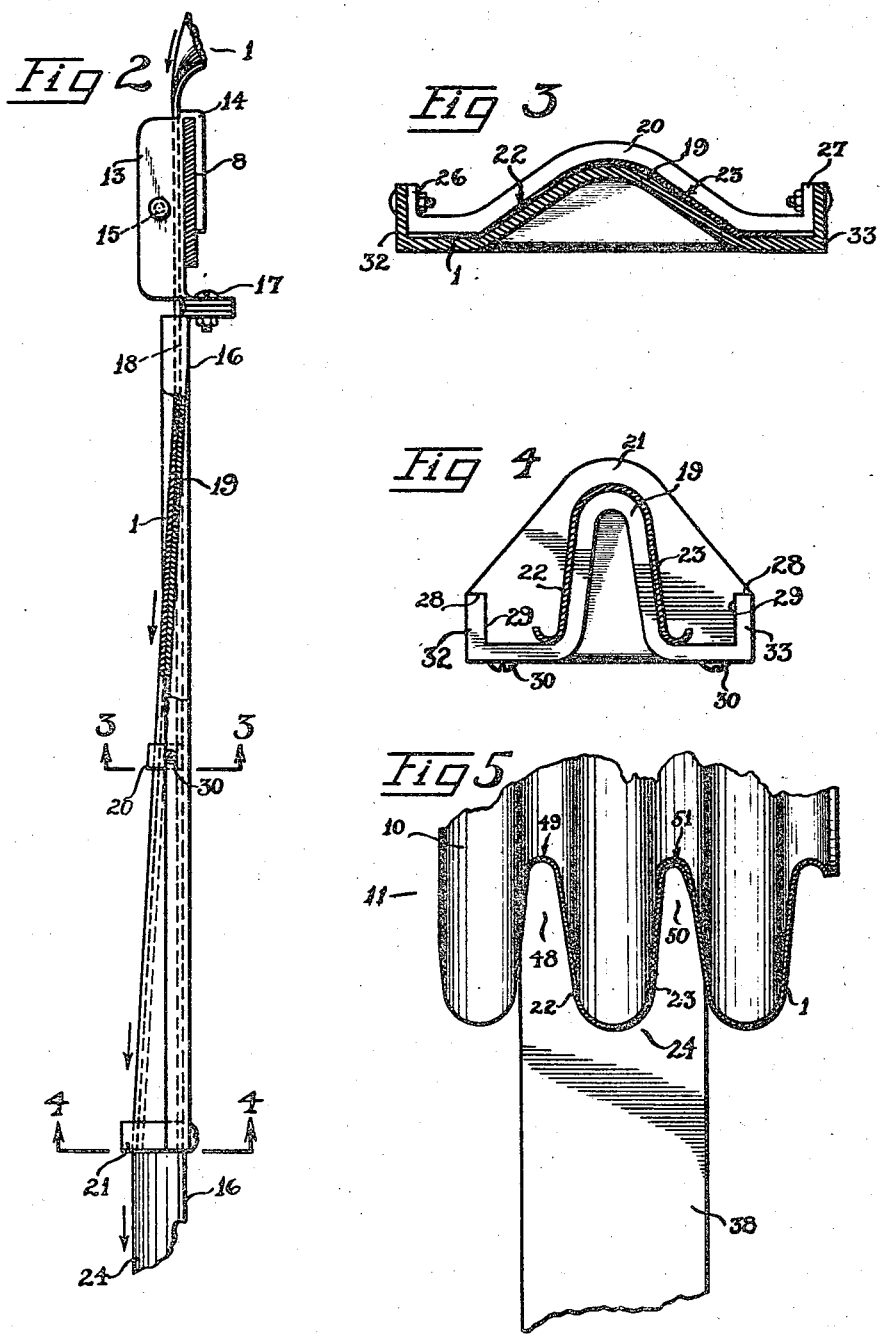

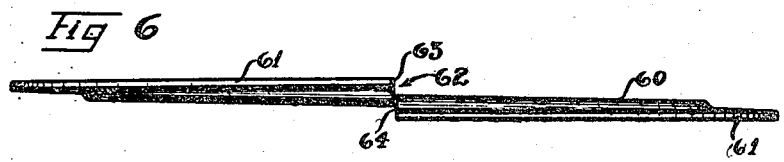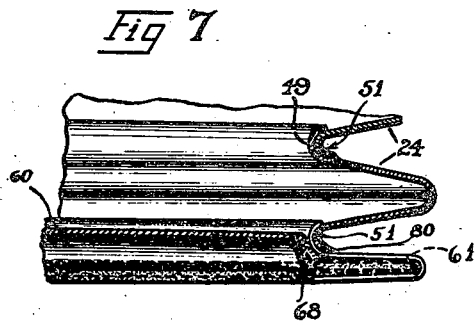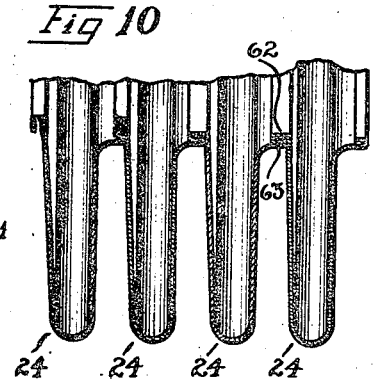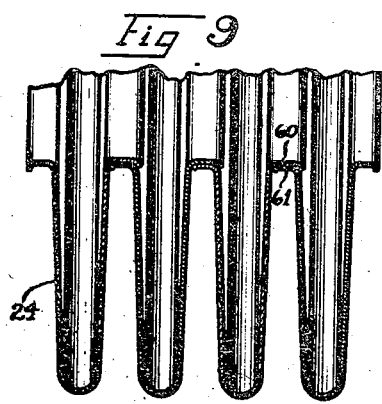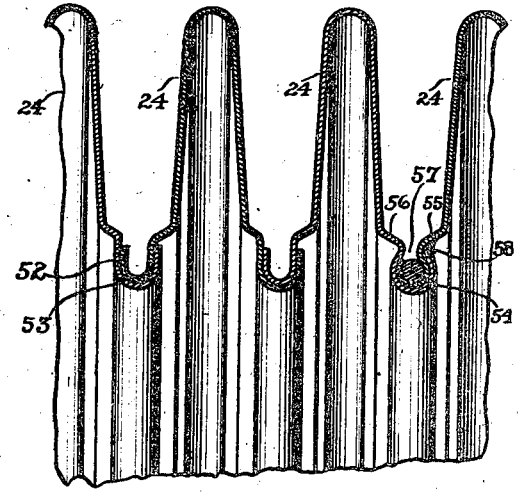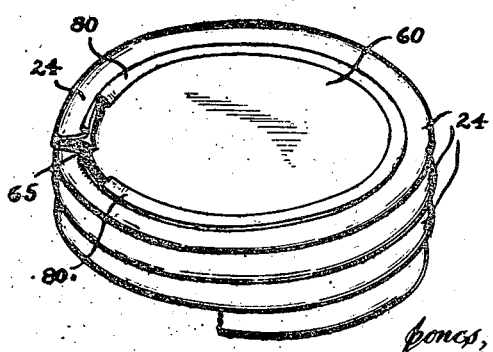

INVENTOR
John S. Baker
Jones, Addington, Ames & Seibold
ATTORNEYS

July 28, 1936.   J. S. BAKER   2,049,100
HELICAL BELLOWS AND METHOD OF MAKING THE SAME
Filed March 21, 1932   5 Sheets-Sheet 5
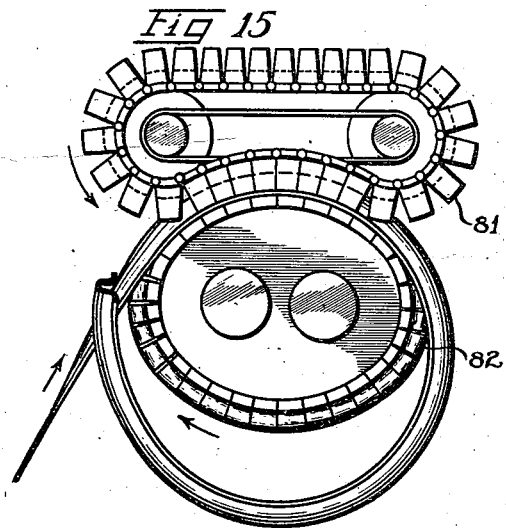
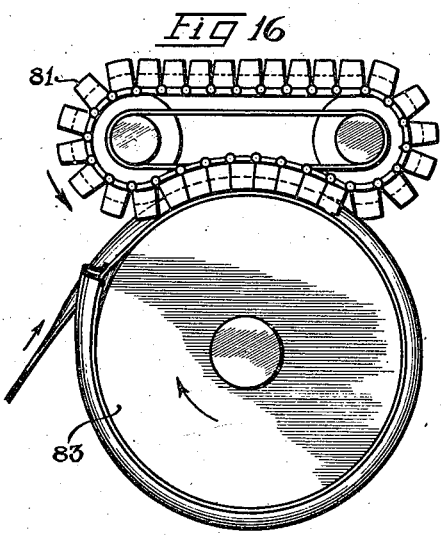
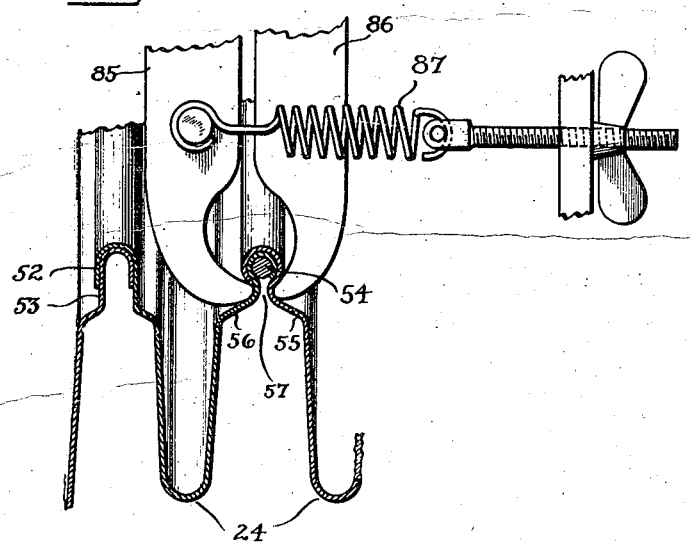
INVENTOR
John S. Baker
Jones, Addington, Ames, & Seibold
ATTORNEYS Patented July 28, 1936

2,049,100

UNITED STATES PATENT OFFICE 2,049,100

HELICAL BELLOWS AND METHOD OF MAKING THE SAME

John S. Baker, Chicago, Ill., assignor to Cook Electric Company, Chicago, Ill., a corporation of Illinois Application March 21, 1932, Serial No. 600,093

8 Claims. (Cl. 113—120)

The invention relates to flexible bellows and methods of and apparatus for making the same.

Bellows may be divided mainly into two different types, i. e., the corrugated wall type formed from a tubular blank and the sectional plate assembly having individual plates mechanically interlocked at their peripheries. Both types are now applied to a great variety of uses which require that they possess to a high degree the characteristics of elasticity of form and uniformity of action, and also of great durability of performance, under repeated stress. In many uses to which they are put, a relatively large elastic range of movement is required to insure that the wall shall return to its original form and length, without taking a permanent set, after the deforming force has been removed. The importance of this elasticity of form, as a whole, as contrasted with the elastic limit of the metal, becomes apparent when it is remembered that the walls are frequently required to withstand a variation in axial length of twenty-five per cent, or even more, of the bellows' length, whereas the metal of which they are ordinarily made may have an elastic limit of less than two per cent. Many uses to which these devices are put require great endurance and life of the wall because it must withstand many millions of flexures without rupture.

The corrugated wall bellows made from a tubular blank is fabricated into shape by subjecting the tube to various cold working operations, by means of which this tube is converted into the required corrugated form. Each time the blank is subjected to a drawing operation which reduces the diameter of the same, and it is customary to subject the blank by small increments and thereby avoid imposing undue strain upon the metal in its walls, a portion of the end of the blank is worked over into the tubular wall. As the entire tubular wall is subjected to cold working during each drawing operation, it follows that the tubular wall is composed of a plurality of zones, each of which is subjected to one less cold working operation, from the top to the bottom. It follows, therefore, that if the blank is subjected to an annealing operation after each drawing operation so as to remove brittleness, which is produced by the drawing operation, and the annealing operations are not effective to eliminate all the effects of cold working operations, a wall will be produced having a plurality of zones of different physical characteristics. The flexibility and durability of the metal must differ, in the different zones, progressively from the bottom up, and consequently, the metal wall lacking uniformity in its physical characteristics is no stronger than its weakest zone. This method of working the metal to convert it into the required corrugated form from a tubular blank and the necessity of using a tubular blank in order to carry out this method of procedure, also inherently limits the diameter and length of the bellows which may be produced.

The same limits are not inherent in the sectional plate type of bellows and I have found that the limited cold working operations required to form the plates in this type of bellows will not detrimentally affect the physical characteristics of the metal, but, quite to the contrary, impart life or durability by hardening the metal to increase its elasticity and insure that it will return to its original form or length, without taking a permanent set, after the deforming force has been removed. Annealing operations are not necessary after the drawing operations so that the problem of overcoming the presence of zones of different physical characteristics to obtain uniform flexibility and durability throughout the wall is absent. Notwithstanding the superiority of this type of bellows, the method employed heretofore to make this product resulted in much waste of material, increasing in proportion to the diameters of the plates, and expense in tooling for the various sizes.

To overcome the above noted objections, and to secure the benefits of my invention, I propose to employ a method of making flexible walls for collapsible and expansible bellows which primarily contemplates the use of strip stock formed into a helix with its edges lying in overlapping engagement, and mechanically or otherwise locked together to form a continuous flexible wall. The drawing operations required to provide the flange formation, which may be given the metal strip cross-sectionally, and to provide the helical shape, avoid the necessity of working the metal to an extent of detrimentally changing its physical characteristics. One of the objects of the present invention is to provide a helically-shaped bellows having its flexible wall made of strip stock by cold working operations which increases the life or durability, as well as the resiliency of the finished wall and which provides for uniformity of the metal throughout so as to eliminate zones of different physical characteristics. It is a further object of the invention to eliminate the waste material necessary when sectional plates are formed, which waste includes the inner portions and the outer corners cut away to shape the plates circular.

A still further object of the invention is to increase the durability of the finished product, since the elimination of one of the seams reduces the possibility of leaks by at least fifty per cent.

Another advantage of the present invention is ease with which strip stock may be fabricated into helixes of different lengths and diameters without apparent sacrifice of strength or resiliency. The following are also some of the many advantages that may be obtained:

(A) Economy in use of material (strip stock).
(B) Economy in tooling for various sizes.
(C) Economy in production.
(D) Deeper flanges and a consequent greater expansibility for given lengths of bellows.
(E) Use of any type of deep drawing material.
(F) Limited cold working of the metal and a consequent increased hardness and durability.
(G) Possible use of metal of greater hardness and a consequent increased strength for the finished product.

In order to apprise those skilled in the art how to practice my invention, I shall now describe several preferred embodiments thereof in connection with the accompanying drawings.

In the drawings:

Figure 1 is a perspective view illustrating a machine for forming a helical bellows from strip stock;

Fig. 2 is a detailed vertical sectional view of that portion of the machine which feeds the strip stock under tension through the forming device onto the mandrel;

Fig. 3 is an enlarged detailed sectional view taken on line 3—3 of Fig. 2 looking in the direction of the arrow;

Fig. 4 is a similar view taken on line 4—4 of Fig. 2 looking in the direction of the arrows;

Fig. 5 is an enlarged detailed sectional view of a portion of several convolutions of the helix showing the manner in which the die feeds the strip stock after formed cross-sectionally onto the convolutions of the mandrel;

Fig. 6 is an edge view of a closure plate that may be used for the ends of the helical bellows;

Fig. 7 illustrates one way of securing this end closure to the end convolution of the bellows;

Fig. 8 illustrates the edges of adjacent convolutions in overlapping relation, and also the manner of imbedding a reinforcing member therein;

Fig. 9 illustrates the overlapping edges of adjacent convolutions shaped somewhat differently to permit welding in order to secure a mechanically tight, and, if so desired, a hermetically sealed joint;

Fig. 10 illustrates these overlapping edges formed somewhat differently to secure a different form of joint;

Figure 11:
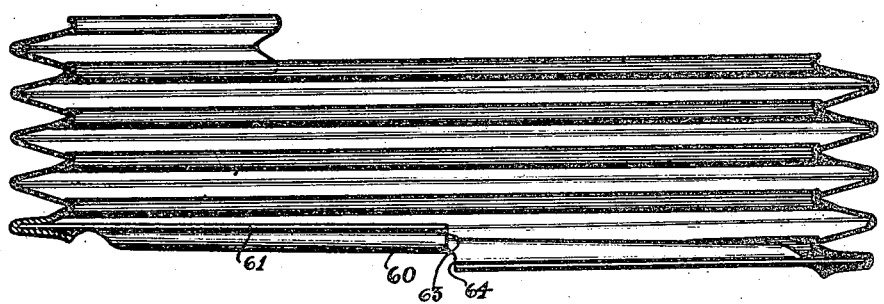

Figs. 11 to 14, inclusive, illustrate different forms of end closures which may be used, including the plate shown in Fig. 6;

Figs. 15 and 16 illustrate the different constructions which may be used to feed the strip stock on collapsible or rigid disks to form helical bellows;

Fig. 17 illustrates mechanism that may be used to form a crimping operation in order to imbed a reinforcing member in the overlapping edges of adjoining convolutions, as shown in Fig. 8; and Fig. 18 is a view of one end of a helical bellows to illustrate the manner of attaching an end plate thereto.

The method disclosed herein advantageously permits the use of practically any deep drawing metal, such as phosphorous bronze, stainless steels, copper silicon alloy, etc. It also permits the formation of deeper flanges which give greater expansibility for given lengths of bellows.

Metal 1 may be strip stock, if so desired, which may be first placed under tension, then shaped cross-sectionally according to preferred design of flange desired, which may be a U or V, as shown in the drawings, or other desirable form, and finally fed to a mandrel to form a helix.

These steps may be varied somewhat in practice. I preferably provide the strip stock 1 on a spool 2 suitably supported upon a shaft 3 carried by bearings 4 in the upper end of a rigid frame including the side angle irons 6 and 7 and a cross bar 8, supported upon and movable with a lathe tool block 9. While it is not essential broadly to keep strip stock 1 under tension as it is fed to the mandrel to form a helix, it is preferable, and consequently, the strip stock 1 is formed cross-sectionally while under tension, and then is fed to the continuous helical thread 10 of mandrel 11 in this shape. Limited cold working of metal does not detrimentally affect the physical characteristics so as to produce brittleness in the metal, but, on the contrary, beneficially increases the hardness or elasticity so that the finished product may have greater expansion without taking a permanent set. Placing strip stock 1 under tension and shaping it cross-sectionally and slightly drawing the metal as it is fed to the helical thread 10 increases, I have found, this desirable hardness without producing any detrimental change of physical characteristics, the drawing placing the metal under tension and producing what may be termed "spring metal".

The metal is fed downwardly between guide plates 12 and 13 which may be carried by a block 14 grooved, as shown in Figs. 1 and 2, to be carried by cross bar 8. A cross pin 15, carried by guides 12 and 13, holds strip stock in position as it is fed downwardly therebetween.

As shown in the drawings, a helically shaped bellows may consist of a continuous helical flange 24 having edges of adjoining convolutions overlapping. Forming die plate 16 serves cross-sectionally to shape the metal strip 1 into this flange 24 before it is fed to the helical thread 10 of mandrel 11. It is provided with a limited flat surface 18 at its upper end, over which the metal stock first travels and ridge 19 (see Figs. 1 to 4, inclusive), increasing in height and width, beginning at the base of this flat surface 18 and continuing to the lower end of the die plate. The taper of ridge 19 is gradual so that as the strip stock 1 passes thereover, it will be gradually shaped cross-sectionally to assume the shape of flange 24.

Ridge 19 is shown slightly extended at the point engaged by die tool 20, as shown in Figs. 2 and 3, but it protrudes considerably at the point of die tool 21, as shown in Figs. 2 and 4. These cooperating die tools 20 and 21 act to confine metal strip 1 under tension against this ridge 19 of die 16, and also to complete the drawing operation of the metal into its final cross-sectional form. The metal is first folded over the peak of ridge 19, as shown in Fig. 3, and the side edges are brought together to form opposite walls 22 and 23 of the helical flange 24. The shape of the peak of ridge 19 determines the form given to the flange between walls 22 and 23. Ridge 19 may be of U formation, as shown in Fig. 4, or of V formation to form a V-shaped flange 24, as shown in Figs. 11 to 14, inclusive, or any other desired formation. Die plate 16 is provided with substantial side walls 32 and 33 throughout its entire length. Die tool 20 is provided with cooperating walls 26 and 27, which are bolted to walls 32 and 33 of the die plate. Die tool 21 is provided with surfaces 28 and 29 on opposite sides, to cooperate with walls 32 and 33 of the die plate. Screws 30 may be used to secure this die tool 21 to die plate 16.

Mandrel 11 is connected to the lathe head stock (not shown) by a shaft 31, and turns therewith, winding the flange 24 into helical formation. Any type of device may be used to feed helical flange 24 from die plate 16 to flange 10 of mandrel 11. I preferably mount the superstructure carrying the spool 2 and die plate 16 to a lathe tool block 9 of any conventional type having a lathe tool post 37. The lathe tool block 9, together with the lathe tool post 37, move in the direction indicated by the arrow in Fig. 1 at a rate corresponding to the rotational speed of mandrel 11, or, more specifically, at a rate permitting tool 38, carried by tool post 37, to move a distance equal to the pitch of the helical thread 10 on mandrel 11, upon each revolution of said mandrel. The manner in which this is accomplished will be understood by those skilled in the art.

It is preferable to provide a substantial superstructure, including the angle iron posts 6 and 7, upon lathe tool block 9 in view of the fact that the metal is pulled by a downward, counterclockwise motion of mandrel 11 as it rotates. A brake 39 cooperating with spool 2 is also provided to place metal stock 1 under tension. A suitable adjusting member 40 may be provided for the brake to control the amount of tension on the strip stock. If so desirable, reinforcing frame members 41 and 42 may be furnished for the angle irons 6 and 7. The starting end of metal strip 1, designated 43 in Fig. 1, may be pulled over the die plate 16 and through the die tools 20 and 21, and also through the die 38. End 43 may then be locked by means of a member 44 to the side of the mandrel adjacent to the forward end of helical mandrel thread 10. When mandrel 11 is rotated in the direction of the arrow, shown in Fig. 1, the metal strip will be pulled tightly downwardly by the rotative force of this mandrel, while die 38 will act firmly to feed helical flange 24 to and against the mandrel helical thread 10. The number of turns or convolutions of mandrel helical thread 10 need not necessarily determine the number of convolutions of the U-flange 24 which any one bellows may comprise. After the mandrel is revolved a sufficient number of times to pull flange 24 over and upon its helical thread 10, end 43 of flange 24 may be released from lock 44 and the flange freed from thread 10 and slipped forwardly to rest upon a rack 45 carried by the forward end of mandrel 11, while the lathe tool block 9 may likewise be moved to the right or starting point on the mandrel, whereupon the formation of flange 24 may continue so that there need be no limit to the number of convolutions flange 24 may be given to form one continuous helical bellows. I have found that if the original set of convolutions of flange 24 are freed from helical thread 10 and moved to the right upon the open frame 45, the continued helical formation of this flange 24 may take place—these first convolutions riding upon frame 45 as it revolves with mandrel 11.

The manner in which the side edges of helical flange 24 may overlap is shown clearly in Fig. 5. This overlapping relation requires one of the cooperating edges between adjacent convolutions to be smaller than the other to the extent of the thickness of the metal. Consequently, prong 48 of die 38 shaping inner edge 49 is provided slightly longer than prong 50 shaping the outer edge 51. Edges 52 and 53 of the bellows shown in Fig. 8, are shown somewhat differently shaped from edges 49 and 51 of the bellows shown in Fig. 5. The exact shape of these edges may be very aptly controlled in the forming operation by the shape of prongs 48 and 50, forming dies 16, 20 and 21, and the cooperating surfaces on the helical thread 10 of mandrel 11. Edges 52 and 53 are of such depth as really to constitute flanges, but, for the purpose of consistency in this description, the term "edge" will be maintained to describe them.

If so desired, a reinforcing member 54 may be inserted in the groove of the outer edge 53, as shown in Fig. 8, and the walls 55 and 56 of these edges may be crimped, as indicated generally at 57, to mechanically lock this reinforcing member 54 in position. It is found desirable to provide reinforcing member 54 somewhat resilient, although this is not essential. After the crimping operation, this joint may be hermetically sealed by the application of solder at the point 58 or 57 shown in Fig. 8. This soldering operation may be carried out by placing the helical bellows on end, preferably upon a rotating table, and applying the solder with an iron as the bellows rotates. I find that carrying out this step in this fashion results in a very uniform and substantial solder seal.

In Fig. 9, overlapping edges 60 and 61 of adjacent convolutions are shown flat to permit these edges to be welded in order to secure a mechanically locked and hermetically sealed joint, if so desired, between convolutions.

In Fig. 10, edges 62 and 63 are shown mechanically interlocked by a combined folding and crimping operation.

A novel form of plate or closure member has been provided for the ends of the bellows. These plates or end closures may be secured in different ways as shown in Figs. 11 to 14 inclusive. In Figs. 6, 7 and 18, I have shown a substantially flat plate 60 having its outer edge portion shaped into a helical flange 61, this edge portion being cut at 62 in order to allow flange 61 to be threaded preferably into the end convolution of the bellows. As shown in detail in Fig. 7 and in elevation in Fig. 18, either edge 63 or 64 may be inserted in the open end, indicated at 65 in Fig. 18, of the end convolution of the helical flange 24 to permit this flange 61 to be threaded into this last convolution, such threading action being easily obtained by rotating plate 60 until the opposite edge is flush with open end 65. Solder may be applied at open end 65 to hermetically seal the same, as indicated at 68 in Fig. 7 (this solder being broken away at open end 65 in Fig. 18), and also about the upper edge at 80 to hermetically seal this end of the bellows.

Figure 12:
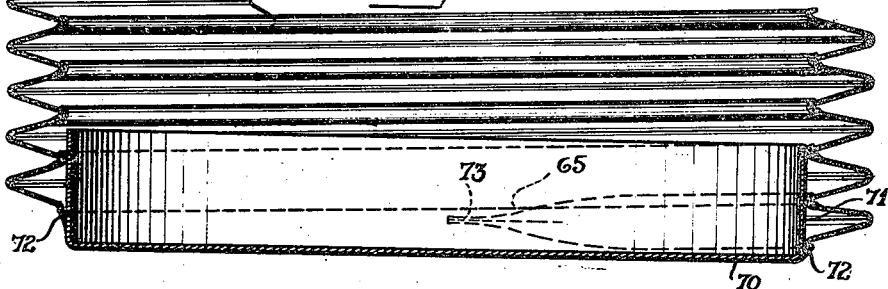

End plate 70 shown in Fig. 12 is provided with an annular flange 71 extending upwardly into the interior of the bellows. Solder may be applied at 72 to provide a hermetical seal, the open end 65 of the last convolution being pinched together as indicated at 73, and sealed so as to complete the hermetical seal between end plate 70 and the bellows.

Figure 13:
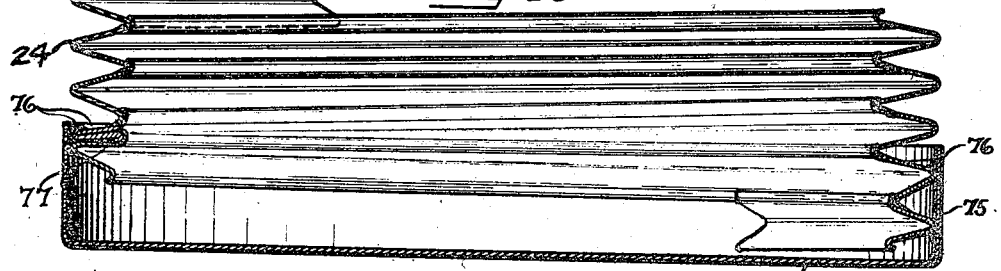

In Fig. 13, the end plate 74 is provided with an external annular flange 75. Solder is applied at 76 while the open end 65 of the last convolution is brought against the adjoining convolution and soldered as at 77 to complete the hermetical seal.

Figure 14:
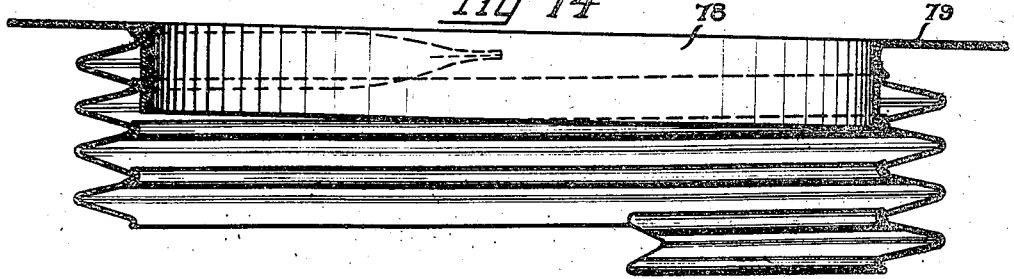

In Fig. 14, end plate 78 is provided with a radial flange 79, sometimes desirable in forming end connections for bellows. The hermetical seal is provided in the same manner as previously described.

Although I have illustrated a rotating mandrel having a helical thread thereon, and a rigid die 38 cooperating therewith, as a means of forming the flange 24 into a helix, it will be understood that the stock metal 1 may be worked in other ways to secure this helical formation. For instance, in Fig. 15 I have illustrated a continuously traveling caterpillar-like die 81 cooperating with a collapsible disk 82. Suitable means may be employed to feed the strip stock 1 to this die 81 and disk 82 and to receive the same after passed therethrough. In Fig. 16 the caterpillar die 81 is shown cooperating with a fixed disk 83.

Walls 55 and 56 of edges 52 and 53, as shown in Fig. 8, may be crimped in any suitable way, such as by the crimping jaws 85 and 86, suitably held in operating relation by spring means 87 upon any suitable support. This crimping operation may be varied according to the type of joint desired. Consequently, I do not intend to be limited to any particular crimping method or device to be used.

From the foregoing description it will be apparent that the metal strip may be formed into a helix by first forming a flange 24 and thereafter bringing this flange about a helical thread upon a rotating mandrel. It will also be apparent that forming the helix may be accomplished in various ways, and I therefore do not intend to be limited to the exact details of performing this forming operation. I do not intend to be limited, on the other hand, to placing the metal strip 1 under tension before forming the flange 24, although better results may be obtained so far as I know at the present time if this step is included in the method.

Without further elaboration, the foregoing will so fully explain the gist of my invention, that others may, by applying current knowledge, readily adopt the same for use under varying conditions of service, without eliminating certain features which may properly be said to constitute the essential items of novelty involved, which items are intended to be defined and secured to me by the following claims.

I claim:

1. A metallic bellows structure comprising a continuous resilient helically formed flange having hermetically sealed edges between adjacent convolutions and an end closure mechanically interlocked with one of the end convolutions.

2. A metallic bellows structure comprising a continuous resilient helical flange having hermetically sealed edges between adjacent convolutions and having an end plate provided with a helically formed circumferential edge mechanically interlocked with one of the end convolutions of the helical flange.

3. A metallic bellows structure comprising a continuous resilient helical flange having hermetically sealed edges between adjacent convolutions and having an end plate provided with a helically formed circumferential edge mechanically interlocking with one of the convolutions of the helical flange, and a hermetical seal between said circumferential edge and said convolution.

4. A metallic bellows structure comprising a continuous resilient helical U flange, an end closure provided with a split helically formed circumferential edge interlocking with the groove of one of the end convolutions of said helical flange, one end of said circumferential split edge having been entered in said groove and moved therein until the opposite end thereof substantially aligns with the free end of said end convolution, and means providing a hermetical seal between said circumferential edge and said end convolution.

5. A metallic bellows structure comprising a continuous resilient helical U flange having adjoining edges of successive convolutions mechanically interlocking with each other, an end closure, a substantially helically formed circumferential edge on said end closure interlocked with the end convolution of said helical U flange, said circumferential edge being split to provide for its helical formation and interlocking relation with the groove of one of the end convolutions, one of said split ends being inserted in said groove of one of the end convolutions and said end enclosure being rotated until the opposite end of said circumferential edge substantially enters said groove, and means for hermetically sealing said circumferential edge and said end convolution.

6. The method of making a longitudinally flexible metallic bellows which includes first placing a strip of spring metal under tension, then forming a relatively deep groove in the strip while it is held under tension and conforming the sides thereof into flanges having preformed interlocking edges, then helically coiling the strip after thus formed and overlapping the preformed interlocking edges of adjacent convolutions in interlocking relation, sealing said interlocking edges to provide a hermetically sealed helically formed flanged wall, and finally permanently attaching an end fitting to said wall by hermetically sealing said fitting to an end convolution.

7. The method of making a longitudinally flexible metallic bellows which includes tensioning a strip of spring metal, thereafter grooving the tensioned strip to form side flanges having preformed interlocking edges, thereafter helically coiling the grooved tensioned strip to bring said preformed interlocking edges of adjacent convolutions in overlapping relation, and sealing said overlapped interlocking edges to provide a hermetically sealed helically formed flanged wall.

8. The method of making a longitudinally flexible metallic bellows which includes tensioning a strip of spring metal, thereafter grooving the tensioned strip to form side flanges having preformed interlocking edges, thereafter helically coiling the grooved tensioned strip to bring said preformed interlocking edges of adjacent convolutions in overlapped relation, the overlapped interlocking edges forming inward turned loops of the helix, sealing the overlapped interlocking edges to provide a hermetically sealed helically formed flanged wall, and attaching a fitting to at least the end convolution by a hermetically sealed relation.

JOHN S. BAKER.